J. W. MOSHER.
Grape-Pickers.
No. 148,488. Patented March 10, 1874.
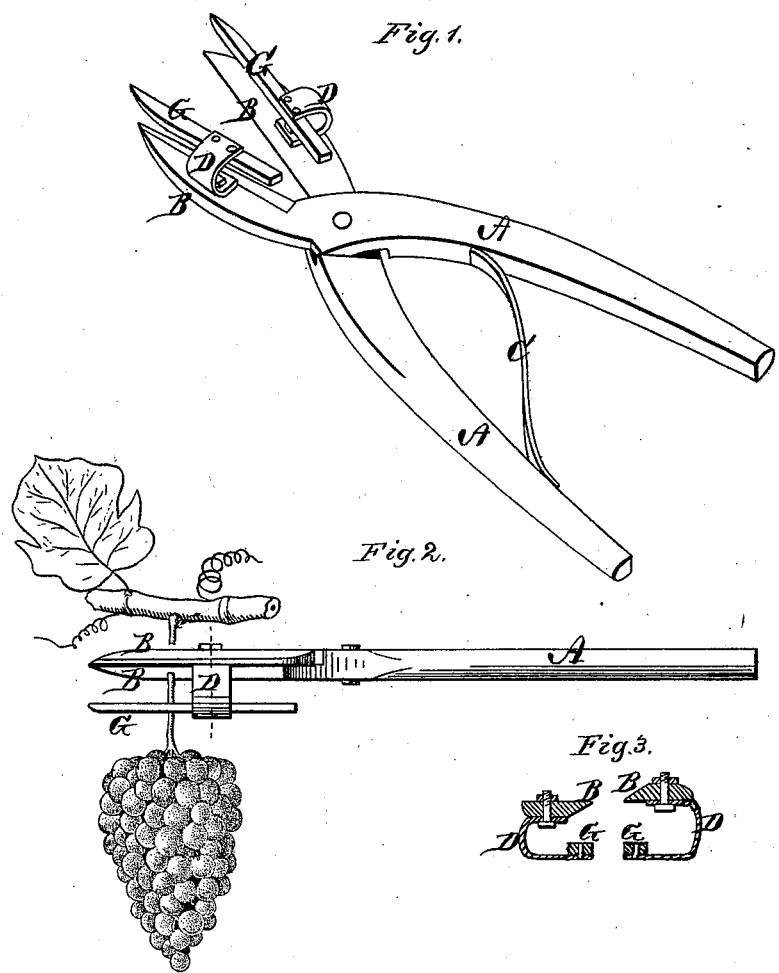
WITNESSES.
Henry N. Miller
C. L. Ewrt,
INVENTOR.
J. Wilber Mosher
Alexander Tuator
By
Attorneys.

UNITED STATES PATENT OFFICE.

J. WILBER MOSHER, OF WEST LIBERTY, IOWA.

IMPROVEMENT IN GRAPE-PICKERS.

Specification forming part of Letters Patent No. 148,488, dated March 10, 1874; application filed September 15, 1873.

*To all whom it may concern:*

Be it known that I, J. WILBER MOSHER, of West Liberty, in the county of Cedar and in the State of Iowa, have invented certain new and useful Improvements in Grape-Picker; and do hereby declare that the following is a full, clear, and exact description thereof, reference being had to the accompanying drawings, and to the letters of reference marked thereon, making a part of this specification.

The nature of my invention consists in clamps attached to the blades of a pair of shears, for the purpose of clamping and holding the stem of a cluster of grapes when cut by the shears, so as to prevent them from falling on the ground and becoming bruised, as will be hereinafter more fully set forth.

In order to enable others skilled in the art to which my invention appertains to make and use the same, I will now proceed to describe its construction and operation, referring to the annexed drawing, in which—

Figure 1 is a perspective view of a pair of shears with my improvement attached. Fig. 2 is a side view of the same, and Fig. 3 is a cross-section through the shear blades and clamps.

A A represent the handles, and B B the blades, of an ordinary pair of shears, provided between the handles with a spring, C, to throw them apart after the pressure on the handles is released. To each blade B is attached a spring, D, bent substantially in the manner shown in Fig. 3, and carrying at its outer end a jaw, G, the two jaws forming, when brought together by the closing of the shears, a clamp.

In cutting off the cluster of grapes, the shear-blades are held next to the vine. While they sever the stem close up to the vine, the clamps close upon the stem below the shears, or next to the cluster, and retain it until released. The clamps being attached to the blades by means of spring-holders allows them to yield sufficiently, and yet retain their hold on the stem.

Shears with this improvement may be used for other purposes as well as for picking grapes—for instance, they may be of great advantage in gathering tobacco.

I am aware that a fruit or flower gatherer has been heretofore known in which elastic pads, plates, or similar devices have been attached for holding the stem of the fruit or flower after the same has been cut; hence I do not broadly claim such as my invention.

Having thus fully described my invention, what I claim as new, and desire to secure by Letters Patent, is—

In combination with the handles A A, spring C, and cutting-blades B B, the bars G G, connected to the bent springs D D, which are secured to the under surfaces of the blades B B, all constructed as shown and described.

In testimony that I claim the foregoing I have hereunto set my hand this 29th day of August, 1873.

J. WILBER MOSHER.

Witnesses:
   C. L. EVERT,
   A. N. MARR.